(12) United States Patent
Schwartze et al.

(10) Patent No.: US 11,068,053 B2
(45) Date of Patent: Jul. 20, 2021

(54) METHOD AND SYSTEM FOR DISPLAYING AT LEAST ONE SPATIAL SECTION, WHEREIN THE SPATIAL SECTION IS DISPLAYED AS A FUNCTION OF AN EYE POSITION OF A PERSON

(71) Applicant: AUDI AG, Ingolstadt (DE)

(72) Inventors: Sebastian Schwartze, Ingolstadt (DE); Markus Klug, Ingolstadt (DE); André Schwager, Ingolstadt (DE); Muhammad Ali Kezze, Aachen (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 16/649,526

(22) PCT Filed: Jul. 31, 2018

(86) PCT No.: PCT/EP2018/070783
§ 371 (c)(1),
(2) Date: Mar. 20, 2020

(87) PCT Pub. No.: WO2019/057378
PCT Pub. Date: Mar. 28, 2019

(65) Prior Publication Data
US 2020/0310536 A1    Oct. 1, 2020

(30) Foreign Application Priority Data
Sep. 22, 2017 (DE) .................. 10 2017 216 843.9

(51) Int. Cl.
*G06F 3/01*         (2006.01)
*G06T 19/00*      (2011.01)
*H04N 7/14*        (2006.01)

(52) U.S. Cl.
CPC ............. *G06F 3/013* (2013.01); *G06T 19/006* (2013.01); *H04N 7/142* (2013.01); *H04N 7/147* (2013.01)

(58) Field of Classification Search
CPC ........ H04N 7/147; H04N 7/142; H04N 21/00; H04N 13/00; G06T 19/006; G06F 3/013;
(Continued)

(56) References Cited

U.S. PATENT DOCUMENTS 6,919,907 B2 * 7/2005 Berstis ................. H04N 13/383
345/619
9,681,096 B1 * 6/2017 Motta ................... H04N 7/147
(Continued)

FOREIGN PATENT DOCUMENTS

DE    10 2011 083 662 A1    4/2013
DE    10 2013 210 887 A1    12/2014
(Continued)

OTHER PUBLICATIONS

WIPO Translation of International Preliminary Report on Patentability for PCT/EP2018/070783 completed Dec. 18, 2019, 10 pp.s.
(Continued)

*Primary Examiner* — Muhammad N Edun
(74) *Attorney, Agent, or Firm* — Staas & Halsey LLP

(57) ABSTRACT

A first display surface of a first display device in a first space displays a second section of a second space in which a second display device is located. An eye position of a user in the first space is recorded by at least one first recording apparatus. The second section of the second space is determined in dependence on the eye position of the user in the first space and is recorded by at least one second recording apparatus.

15 Claims, 3 Drawing Sheets

(58) Field of Classification Search
CPC .............. G02B 27/0093; G02B 27/017; G02B 2027/0138; B60K 37/02
See application file for complete search history.

(56) References Cited

U.S. PATENT DOCUMENTS

| | | | |
|---|---|---|---|
| 2007/0002130 A1 | 1/2007 | Hartkop | |
| 2014/0362170 A1* | 12/2014 | Walker | H04N 19/176 348/14.08 |
| 2014/0375752 A1 | 12/2014 | Shoemake et al. | |
| 2016/0105640 A1* | 4/2016 | Travis | H04N 7/15 348/14.08 |
| 2016/0203607 A1* | 7/2016 | Muller | G06T 7/80 348/136 |
| 2018/0075659 A1* | 3/2018 | Browy | G06F 3/017 |

FOREIGN PATENT DOCUMENTS

| | | |
|---|---|---|
| DE | 10 2014 204 691 A1 | 9/2015 |
| DE | 102017216843.9 | 9/2017 |
| EP | 3 168 720 A1 | 5/2017 |
| GB | 2541056 A | 2/2017 |
| WO | 00/31974 A2 | 6/2000 |
| WO | 2016/154123 A2 | 9/2016 |
| WO | PCT/EP2018/070783 | 7/2018 |

OTHER PUBLICATIONS

Aliexpress: "TakTark Official Store", printed from fr.alienxpress.com/item/32795024304.htm, dated Jun. 20, 2017.
English translation of International Preliminary Report on Patentability of PCT/EP2018/070783 completed Dec. 18, 2019, 9 pp.
International Search Report dated Jan. 30, 2019 in International Application No. PCT/EP2018/070783.
Office Action dated May 17, 2018 in German Application No. 10 2017 216 843.9.

* cited by examiner

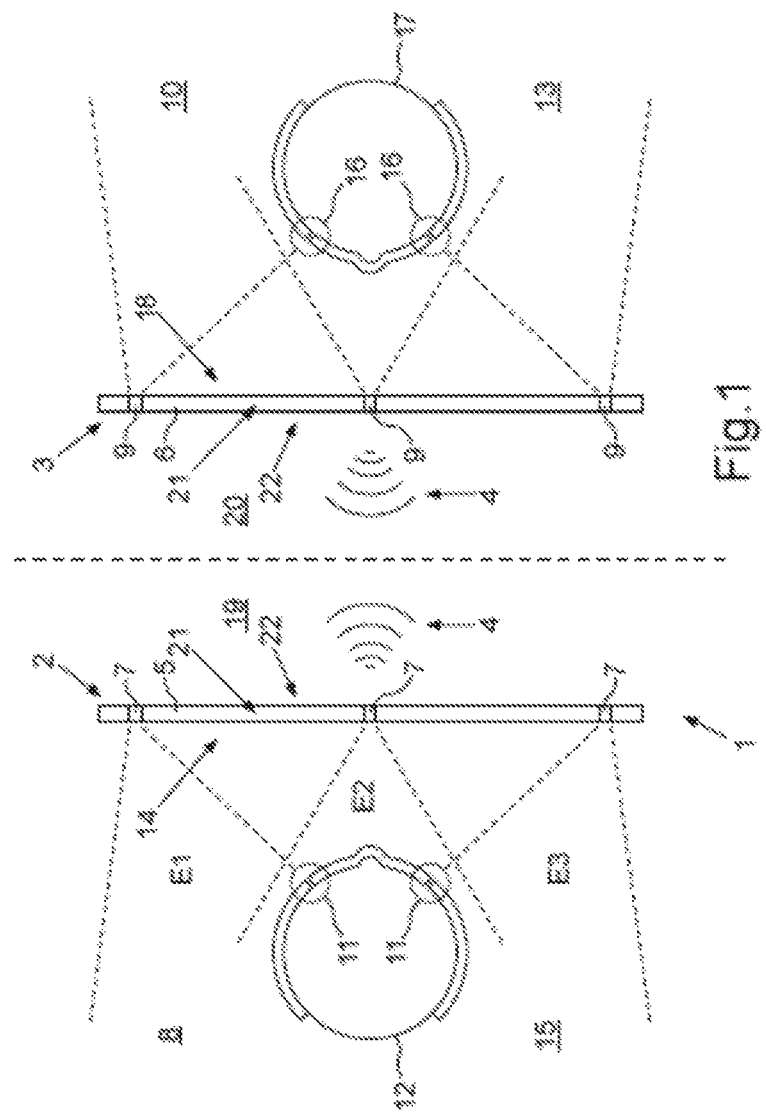

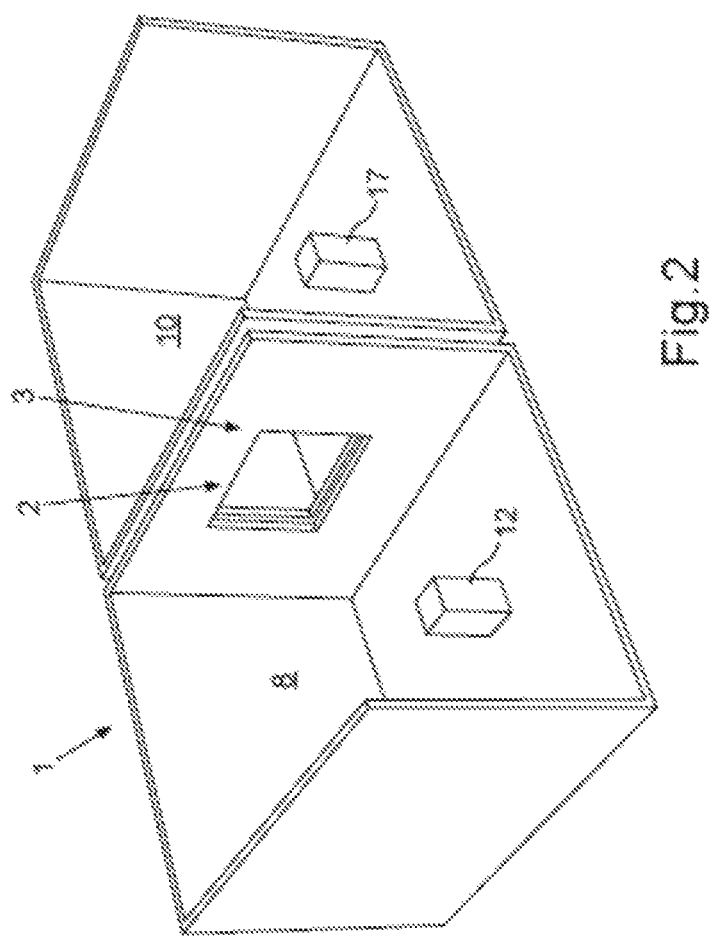

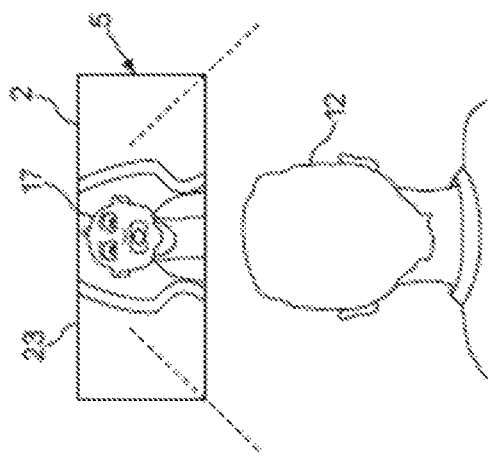
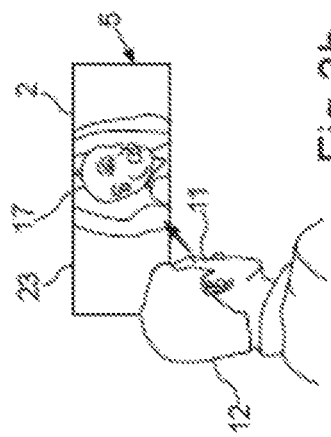
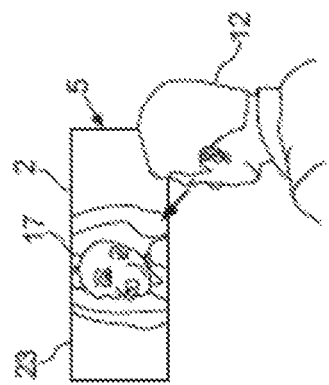

METHOD AND SYSTEM FOR DISPLAYING AT LEAST ONE SPATIAL SECTION, WHEREIN THE SPATIAL SECTION IS DISPLAYED AS A FUNCTION OF AN EYE POSITION OF A PERSON

CROSS REFERENCE TO RELATED APPLICATIONS

This application is a U.S. national stage of International Application No. PCT/EP2018/070783, filed on Jul. 31, 2018. The International Application claims the priority benefit of German Application 10 2017 216 843.9 filed on Sep. 22, 2017. Both the International Application and the German Application are incorporated by reference herein in their entirety.

BACKGROUND

Described below is a method for displaying at least one section of space of at least one space on a first display surface of a first display device for a first person.

The related art includes methods in which, for example, two people are able to communicate with one another by way of video telephony and in the process an image of the first person is transmitted to the second person and an image of the second person is transmitted to the first person. The images are displayed on respective display devices for the respective people. In the process, the respective sections of space are in particular recorded by the respective cameras of the display devices and the image information is transmitted to the respective display device of the counterpart via a network and displayed on the imaging apparatus of the respective display device. A fixed image of the section of space is displayed in the related art. If, for example, the person moves closer to the camera, then the displayed section of space stays the same on the display device for the person. In other words, the displayed section of space from the related art does not change with the viewing direction of the respective person.

SUMMARY

An aspect is to display an improved depiction of a space on a display device as an image for a person.

One aspect relates to a method for displaying at least one first section of space of at least one first space on a first display surface of a first display device for a first person. A second section of space of a second space in which the second display device is located is recorded by at least one camera, and the second section of space is displayed on the first display surface as first image.

The second space is recorded by the camera and an eye position of the first person is recorded by at least one recording apparatus. The second section of space, defined in dependence on the recorded eye position, is displayed on the first display surface as the first image.

It is thereby made possible for the first person to be shown the image of the second space, in particular of the second section of the second space, on the first display surface depending on the eye position of the first person. In other words, the first person is able to see into the second space with different viewing angles and, for example, look around in the second space by changing how the first display device is viewed. Similarly to looking through a window, the second space, which is behind the (virtual) window, is accordingly able to be observed by the first person. By a change in the position of the first person, in particular by a change in the eye position of the first person, it is then accordingly possible to display the second space "behind the window". Particularly realistic communication between the first display device and the second display device is thereby able to be achieved. It is furthermore possible to achieve a situation whereby, for example, objects that are concealed by another object in the second space at a first viewing angle are able to be observed by changing viewing angle. An improved display of the second space is thereby able to be achieved for the first person.

In other words, the second space is recorded by the camera. An eye position is recorded by a recording apparatus of the first person located outside the second space. The second section of the second space is selected by a control apparatus depending on the recorded eye position of the first person. The first display device is driven by the control apparatus so as to display the selected second section of the second space.

It is likewise possible, in addition to the pure image information for displaying the image, also to jointly transmit further information relating, for example, to a temperature or a movement in the space. Sound information may furthermore also be jointly recorded and transmitted. The transmission in particular takes place in real time and with real content.

The recording apparatus may, for example, record the eye position by image processing on an image recorded by another camera. The eye position may also be recorded by recording a temperature of the space in which the first person is located. It is likewise possible for the eye position to be recorded on the basis of markers on the first person.

The first and/or the second display device may furthermore also communicate with at least one further third display device, such that a displayed section of a third space in which the third display device is located is also adjusted accordingly to at least the recorded viewing angle of the first person and is able to be displayed on the first and/or the second display device. By way of example, a third image and/or the first and/or a second image may be displayed on the first and/or the second display surface.

According to one advantageous embodiment, the person and a first space in which the first person is located may be recorded by at least one first camera of the recording apparatus, and a first section of a first space may be displayed on a second display surface of the second display device as second image. In this embodiment, the first section of the first space may, for example, accordingly be displayed on the second display surface of the second display device for a second person who is located in the second space. The second person may thereby, for example, likewise be shown the first person on a display surface of the second display device, as a result of which it is possible to achieve improved communication between the first and the second person.

It has furthermore proven to be advantageous if a second eye position of the second person who is located in the second space is recorded by the at least one second camera of the second display device, and if the second image of the first section of space is adjusted on the second display surface depending on the second eye position. In other words, the second image on the second display surface may likewise be adjusted depending on the second eye position of the second person, also giving the second person a kind of view through a window. As a result, the second image, which displays the first space containing, for example, the first person, may also be adjusted for the second person depending on the position of the second person or the viewing angle of the second person. It is thereby made possible to achieve particularly realistic communication between the first person and the second person depending on the respective viewing angles.

In a further advantageous embodiment, the first person and the first section of space may be displayed on the second display surface as a 3-dimensional second image and/or a second person and the second section of space may be displayed on the first display surface as a 3-dimensional first image. Communication that is particularly close to reality is thereby able to be performed between the people.

It is likewise advantageous if at least the first display surface is provided with a semitransparent design and at least the first image is displayed on the first display surface as augmented reality. There may in particular also be provision for the second image to be displayed on the second display surface as augmented reality. In augmented reality, the person is able to continue to perceive the surroundings behind the first display surface while the image is being projected onto the first display surface. The person is able to see through the first image, as it were, and continue to perceive the surroundings behind the first display surface. It is thereby possible to perform communication in which the person is still able to perceive the surroundings of the display device. By way of example, in a motor vehicle, a window may be used as first display surface and a vehicle occupant, as a person, is able to continue to perceive the surroundings of the motor vehicle and still be shown the first image on the first display surface.

It has furthermore proven to be advantageous if at least the second space is recorded by at least two cameras, in particular by three cameras. There may in particular also be provision, as an alternative or in addition, for the first space and/or the first person to be recorded by at least two cameras, in particular by three cameras, associated with the first display device. Particularly reliable capturing of the space may in particular be made possible by the at least two cameras, in particular by the three cameras, such that a particularly advantageous display of the section of space is in particular able to be achieved depending on the eye position of the person viewing the space. The various viewing angles may thereby in particular be displayed particularly realistically, since the at least two cameras are able to record the space from different directions, and the space is thereby able to be displayed better. It is thereby likewise possible to provide the option of being able to display a hologram or a three-dimensional image.

According to a further advantageous embodiment, at least one first camera capturing the first space and/or a second camera may be designed as an image-capturing film and/or at least the first display surface may be designed as an imaging film. The first display device is thereby able to be provided in a particularly installation space-saving manner in which the first display device has both an image-capturing film and an imaging (image displaying) film. By way of example, a motor vehicle window or a mirror may be used as a display and/or capturing device. It is thereby possible to install such a display device easily and in an installation space-saving manner for many carrier media for the film, such that communication between a person and the space or between a person and a further person may be performed particularly easily and conveniently.

It is furthermore advantageous if the image-capturing film and/or the imaging film is formed on a first carrier element of the first display device. A window or a mirror may, for example, be used as a carrier element. A motor vehicle window or a motor vehicle mirror inside a motor vehicle may in particular be used as a carrier element. It is thereby made possible both for an image to be able to be captured and for an image to be able to be displayed by a single carrier element. This is particularly convenient and saving on installation space.

There may furthermore be provision for an LCD film to be arranged jointly on the first carrier element, which LCD film is able to be darkened pixel by pixel such that depth information of the imaging film is able to be perceived better by the person. The LCD film may in particular be used to darken only the regions on which an image or parts of the image are also displayed, such that the regions where no image is displayed continue to be transparent to the person.

In a further advantageous embodiment, the image-capturing and the imaging film may be provided as a single one-piece film element. In other words, a single film element that is designed to be both image-capturing and imaging may be arranged on the carrier element. It is thereby particularly easy to arrange the film element, which is able to both record and display, on the carrier element, as a result of which it is possible to save on both installation effort and installation space.

A further aspect relates to a system having a first display device and a second display device that are designed to perform a method according to one of the preceding aspects. The first display device is coupled to at least the second display device via a network in order to exchange information. The network may in this case be designed to be both wired and wireless.

Advantageous embodiments of the method should be considered to be advantageous embodiments of the system, wherein the system to this end has features in terms of its subject matter that allow the method to be performed. For this reason, the corresponding developments of the system are not described again here.

BRIEF DESCRIPTION OF THE DRAWINGS

These and other aspects and advantages will become more apparent and more readily appreciated from the following description of the exemplary embodiments, taken in conjunction with the accompanying drawings of which:

FIG. 1 is a schematic view of one embodiment of a system having two display devices for communication between two people;

FIG. 2 is a schematic perspective view of one embodiment of the system with a first space and a second space; and FIGS. 3a-3c are further schematic perspective views of the system in a motor vehicle for communication between two people.

DETAILED DESCRIPTION

Reference will now be made in detail to the preferred embodiments, examples of which are illustrated in the accompanying drawings, wherein like reference numerals refer to like elements throughout.

In the exemplary embodiments explained below, the described components of the embodiments each constitute individual features that should be considered independently of one another and that in each case provide developments independently of one another and should therefore also be considered both individually and in a combination other than the one shown. The described embodiments are furthermore also able to be supplemented by more of the features that have already been described.

In the figures, functionally identical elements are in each case provided with the same reference signs.

FIG. 1 shows a schematic view of one embodiment of a system 1. The system 1 has at least one first display device 2 and at least one second display device 3. The first display device 2 is coupled to the second display device 3 via a network 4 in order to exchange information. The network 4 may in this case be designed to be both wired and wireless.

The first display device 2 has a first display surface 5 and the second display device 3 has a second display surface 6. The first display device 2 furthermore has at least one first camera 7, in the present case three first cameras 7. A first space 8 is able to be recorded using the cameras 7.

A respective recording region E1, E2, E3 is able to be recorded using the cameras 7, such that the first space 8 is able to be recorded, in particular completely.

The second display device 3 has at least one second camera 9, in the present case in particular three second cameras 9. A second space 10 is able to be recorded using the second cameras 9. A respective recording region E4, E5, E6 is in particular able to be recorded by a respective camera 9, as a result of which the space 10 is able to be recorded, in particular completely.

There is provision for the second space 10 to be recorded by the second cameras 9 and for an eye position 11 of a first person 12 to be recorded by the first cameras 7 of the first display device 2. A second section of space 13, which displays at least regions of the second space 10, is displayed on the first display surface 5 as a first image 14 depending on the recorded eye position 11.

There is in particular provision, if the first person 12, in particular the eye position 11 of the first person 12, changes, for the second section of space 13 to be adjusted for the first person 12 according to the eye position 11. This results in a kind of "view through a window" for the first person 12, such that the first person 12 is able to look through a kind of window by the first display device 2 and is thus shown the second space 10 in the same way as through a window. If the eye position 11 changes, the view through the window thus also changes.

There may in particular be provision for further information about the second space 10 to be provided on the first display device 2 in addition to the image 14. By way of example, a temperature and/or a surface quality and/or a movement may be jointly shown on the display device 2.

There may furthermore be provision for a first section of space 15 of the first space 8 to be displayed on the second display surface 6 of the second display device 3. A second eye position 16 of a second person 17 who is located in the second space 16 may in particular be recorded by the second cameras 9, and a second image 18 of the first section of space 15 may be adjusted accordingly on the second display surface 6 depending on the second eye position 16. A kind of view through a window may in particular thereby also be created for the second person 17, such that the second person 17 also looks through the "window" via the second display device 3 and is accordingly able to observe the first space 8 depending on the second eye position 16.

There may in particular be provision for the first display surface 5 and/or the second display surface 6 to be provided with a semitransparent design and for at least the first image 14 and/or the second image 18 to be displayed on the first display surface 5 and/or on the second display surface 6 as augmented reality. In other words, the first person 12 is able to see through the semitransparent display surface 5 and perceive surroundings 19 of the first display device 2. At the same time, the first image 14 may be projected onto the first display surface 5 and be observed as augmented reality. It is likewise possible for the second person 17 to see through the second display surface 6 and perceive the second surroundings 20 of the second display device 3 and for the second image 18 to be displayed on the display surface 6 as augmented reality.

There may furthermore be provision for at least the first camera 7 and/or the second camera 9 to be designed as a respective image-capturing film 21 and/or at least for the first display surface 5 and/or the second display surface 6 to be designed as an imaging film 22.

FIG. 2 shows a schematic perspective view of the system 1. The first person 12 is looking through the first display device 2, in the same way as through a window, and is able to see the second person 17 in the second space 10. The second person 17 is looking through the second display device 3 and is able to perceive the first person 12 in the first space 8, in the same way as through a window. In particular in the event of a change in perspective or in the event of a change in position of the people 12, 17, the respective displays of the sections of space 13, 15 can be adjusted, such that communication that is particularly close to reality is able to be performed between the first person 12 and the second person 17. It may in particular be made possible here, for example, to also jointly transmit sound information in addition to the image. Further communication with at least one further third display device may also take place, wherein a third image may then be displayed on the respective display surfaces 5, 6 in addition or instead.

FIG. 3 shows a further schematic perspective view of the system 1. FIG. 3 schematically shows the change in perspective. The first person 12 is looking through the first display device 2, in particular through the first display surface 5, and is able to see the second person 17, who is shown as a toddler in the present case. In the present example, the first person 12 may, for example, be sitting on a front seat of a motor vehicle and looking, for example, through a front windscreen that contains the display device 2. The child 17 may, for example, be sitting on seats in a rear region and the second display device 3 may, for example, be installed in one seat from among the front seats. In other words, the first person 12 is looking out of the windscreen and is able to observe the second person 17, who is located, for example, in the rear region, through the windscreen or on the display device 2, 3 that is arranged on the windscreen.

There may in particular be provision for the first person 12 and the first section of space 15 to be displayed on the second display surface 6 as a 3-dimensional second image 18 and/or for the second person 17 and the second section of space 13 to be displayed on the first display surface 6 as a 3-dimensional first image 14.

There may furthermore in particular be provision for the image-capturing film 21 and/or the imaging film 22 to be formed on a first carrier element 23 of the first display device 2 and/or of the second display device 3. The image-capturing and the imaging film 21, 22 is in particular provided as a single one-piece film element.

There may furthermore be provision for an LCD film to be arranged jointly on the first carrier element 23, which LCD film is able to be darkened pixel by pixel such that depth information of the imaging film 22 is able to be perceived better by a person 12, 17. The LCD film may in particular be used to darken only the regions on which an image 14, 18 or parts of the image 14, 18 are also displayed, such that the regions where no image 14, 18 is displayed continue to be transparent to a person 12, 17.

FIG. 3 furthermore shows different perspectives in FIG. 3a to FIG. 3c. In FIG. 3a, the first person 12 is looking straight ahead through the first display surface 5 and therefore sees the second person 17 in a front-on view.

In FIG. 3b, the first person 17 has changed eye position 11, in particular in the present case directed his view to the right, such that the second person 17 is then accordingly displayed in rotated form on the first display surface 5.

In FIG. 3c, the first person 12 has turned his viewing direction to the left, such that the second person 17 is displayed on the first display surface 5 according to the lefthand viewing angle of the first person 12.

The examples show overall how to achieve the use of a three-dimensional hologram in order to record and transmit spatial content in a moving virtual space.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A method for displaying, comprising:
   detecting a first eye position, by at least one first recording apparatus, of a first person in a first section of a first space in which a first display surface of a first display device and at least one first camera are located, the first display surface being semitransparent;
   recording a second section, dependent on the first eye position, of a second space in which a second display device is located, by at least one second camera as a first image;
   detecting a second eye position of a second person located in the second space by at least one second recording apparatus;
   recording the first person and the first space by the at least one first camera, dependent on the second eye position, as a second image;
   displaying the first image of the second section of space on the first display surface;
   displaying the second image of the first section of the first space on a second display surface;
   transmitting information relating to a temperature, a movement in the second space and a surface condition of the second display surface, from the second space to the first space; and
   displaying at least one of the temperature, the movement and the surface condition with the first image on the first display surface as augmented reality.

2. The method according to claim 1, wherein the first person and the first section of the first space are displayed on the second display surface as a 3-dimensional image.

3. The method according to claim 1, wherein a second person and the second section of space are displayed on the first display surface as a 3-dimensional image.

4. The method according to claim 3, wherein at least the second space is recorded by at least two second cameras.

5. The method according to claim 1, wherein at least one of the at least one first camera and the at least one second camera is an image-capturing film and/or at least the first display surface is an image-displaying film.

6. The method according to claim 5, wherein at least one of the image-capturing film and the image-displaying film is formed on a carrier element of the first display device and/or of the second display device.

7. The method according to claim 6, wherein the image-capturing film and the image-displaying film are provided as a single one-piece film element.

8. The method according to claim 1, wherein at least one of the at least one first camera and the at least one second camera is an image-capturing film and/or at least the first display surface is an image-displaying film.

9. The method according to claim 8, wherein at least one of the image-capturing film and the image-displaying film is formed on a carrier element of the first display device and/or of the second display device.

10. The method according to claim 9, wherein the image-capturing film and the image-displaying film are provided as a single one-piece film element.

11. A system, comprising:
    a first display device, having a first display surface, viewable from a first space;
    at least one first camera configured to capture at least a first section of the first space as a first image;
    a first recording apparatus configured to detect a first eye position of a first person in the first space;
    a second recording apparatus configured to detect a second eye position of a second person in a second space;
    a second display device, having a second display surface, viewable from a second space;
    at least one second camera, configured to capture a second image of at least a second section of the second space, the second section determined in dependence on the first eye position; and
    at least one processor, coupled to the first display device, the at least one first camera, the first recording apparatus, the second display device, the second recording apparatus and the at least one second camera, configured to
       obtain information relating to at least one of a temperature, a movement in the second space and a surface condition of the second display surface in the second space,
       control the first display device to display the at least one of the temperature, the movement and the surface condition of the second display surface, with the second image on the first display surface dependent on the first eye position, and
       control the second display device to display the first image on the second display surface dependent on the second eye position.

12. The system according to claim 11, wherein at least one of the at least one first camera and the at least one second camera is an image-capturing film and/or at least the first display surface is an image-displaying film.

13. The system according to claim 12, wherein at least one of the image-capturing film and the image-displaying film is formed on a carrier element of the first display device and/or of the second display device.

14. The system according to claim 13, wherein the image-capturing film and the image-displaying film are provided as a single one-piece film element.

15. A motor vehicle, comprising:
    a first display device, having a display surface, viewable by a first occupant of the motor vehicle;
    a first recording apparatus configured to detect a first eye position of the first occupant of the motor vehicle;
    at least one first camera configured to capture at least a first section of an interior of the motor vehicle as a first image;

a second recording apparatus configured to detect a second eye position of a second occupant of the motor vehicle;

a second display device, having a second display surface, viewable by the second occupant of the motor vehicle;

at least one second camera, configured to capture a second image of at least a second section of the interior of the motor vehicle, the second section determined in dependence on the first eye position; and at least one processor, coupled to the first and second display devices, the at least one first camera, the at least one second camera, and the first and second recording apparatuses, configured to control the at least one first camera to capture the first image of the first section in dependence on the second eye position of the second occupant, control the at least one second camera to capture the second image of the second section in dependence on the first eye position of the first occupant, control the second display device to display the first image on the second display surface dependent on the second eye position, obtain information relating to at least one of a temperature, a movement in a space including the second section and a surface condition of the second display surface, and control the first display device to display the at least one of the temperature, the movement and the surface condition with the second image on the first display surface as augmented reality.

* * * * *